United States Patent [19]

Vollnhals

[11] 4,063,041
[45] Dec. 13, 1977

[54] METHOD OF TRANSMITTING DIGITAL DATA OF A PCM/TDM TELECOMMUNICATION NETWORK

[75] Inventor: Friedemann Vollnhals, Wolfratshausen, Germany

[73] Assignee: Siemens Aktiengesellschaft, Munich, Germany

[21] Appl. No.: 667,876

[22] Filed: Mar. 17, 1976

[30] Foreign Application Priority Data

Mar. 17, 1975 Germany ............................ 2511619

[51] Int. Cl.² ................................................ H04J 3/00
[52] U.S. Cl. ................................................ 179/15 BV
[58] Field of Search ........ 179/15 AP, 15 BV, 15 AV, 179/15 BY, 18 FC, 15 BS

[56] References Cited

U.S. PATENT DOCUMENTS

| | | | |
|---|---|---|---|
| 3,652,803 | 3/1972 | Joel, Jr. ............................ | 179/15 BV |
| 3,665,405 | 5/1972 | Sanders et al. .................. | 179/15 BV |

Primary Examiner—Thomas A. Robinson
Attorney, Agent, or Firm—Schuyler, Birch, Swindler, McKie & Beckett

[57] ABSTRACT

The invention relates to a method of transmitting digital data between a digitally operating subscriber station and the subscriber concentrator of a PCM/TDM telecommunication network via a two-wire trunk line at a lesser signalling bit rate than on the TDM highways of the network. Information blocks are transmitted in both directions with at least two PCM words which correspond to successive information samplings of the digital data.

1 Claim, 3 Drawing Figures

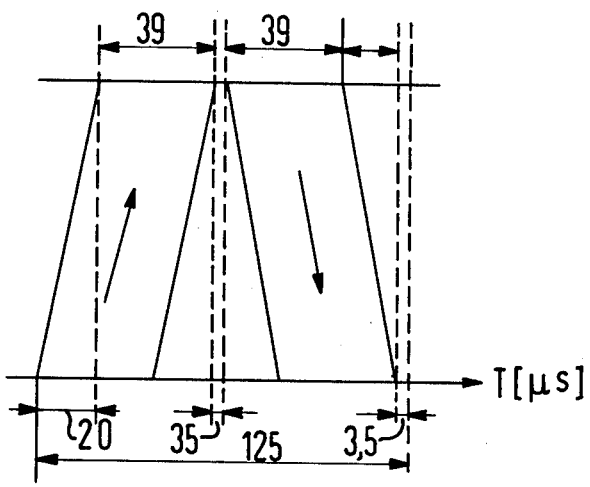
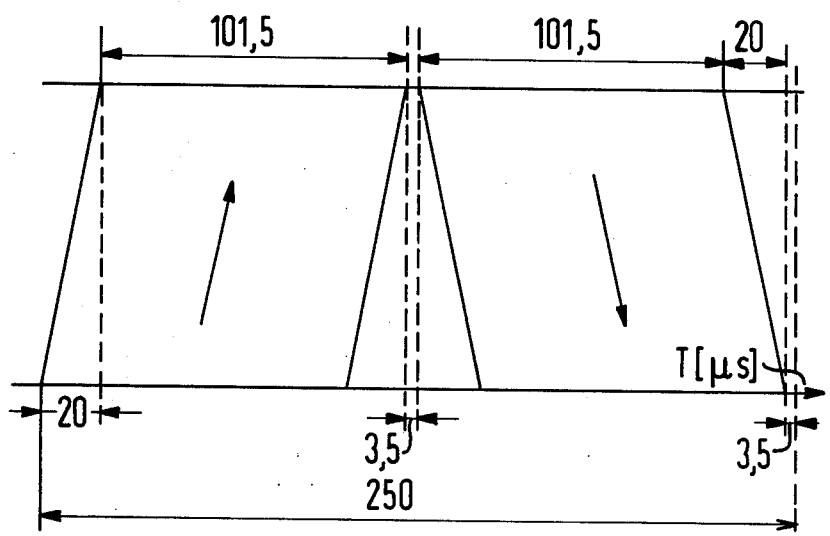

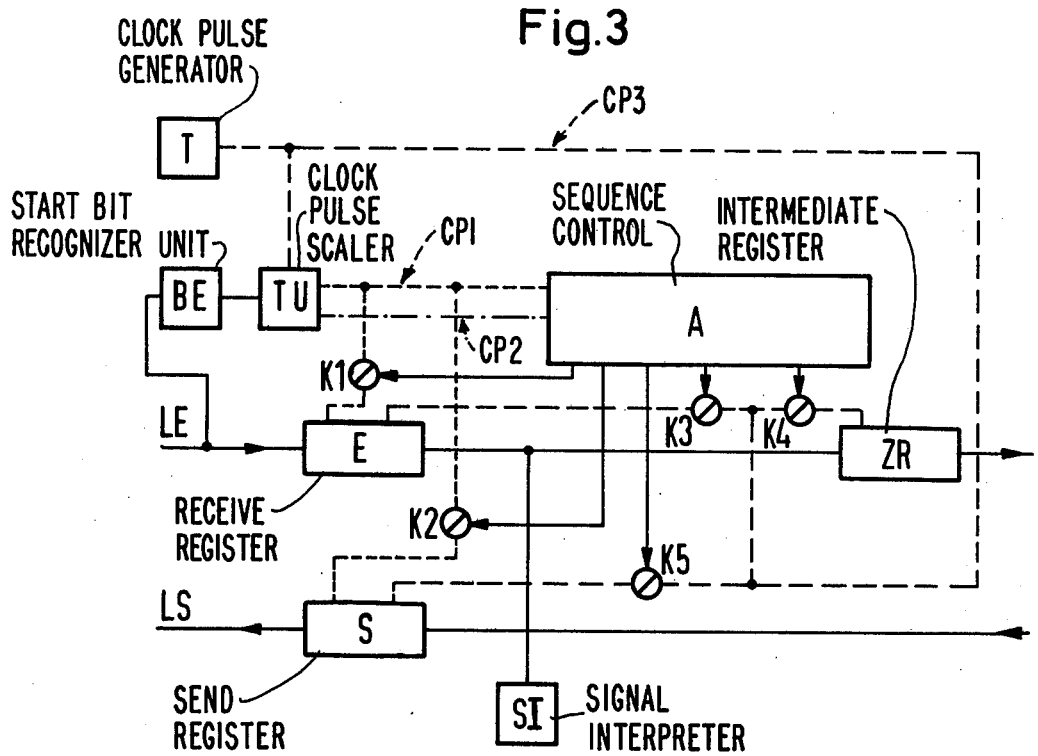

METHOD OF TRANSMITTING DIGITAL DATA OF A PCM/TDM TELECOMMUNICATION NETWORK

BACKGROUND OF THE INVENTION

The digitalization of TDM telecommunication networks up to the subscriber stations has, among other things, the advantage that the subscriber concentrators can be of simpler design.

Normally, four-wire lines are required for the transmission of digital data. That means, however, that the advantage of digitalization of the subscriber stations is negated by an additional outlay caused by the four-wire design of the subscriber lines connecting the subscriber stations to the subscriber concentrator as compared to telecommunication systems in which pulse-amplitude-modulated pulses are transmitted between the subscriber stations and the subscriber concentrator.

In view of the foregoing processing, the data transmission on a two-wire line between the digitally operating subscriber stations and the subscriber concentrator is desirable; the two-wire line in this case is utilized on a four-wire basis through appropriate control of timing hybrid circuits allocated to subscriber stations on the one hand and to the subscriber concentrator on the other by transmitting the data alternately in both directions of transmission over the two-wire line on a time-division basis.

To achieve optimal freedom from distortion during this transmission, that is to say, in order to be able to dispense with an equalizing network where a maximum number of subscriber lines is installed in a local telephone exchange, it has been proposed (West German application No. P 23 46 984.3-31, the equivalent of which is U.S. Ser. No. 506,867 filed Sept. 17, 1974 and now U.S. Pat No. 3,974,339, issued Aug. 10, 1976) to carry out the data transmission on such two-wire subscriber lines at a signalling bit rate less than that on the TDM highways coming in at the subscriber concentrator or going out from there. According to this proposal, the bit signalling rate for transmission on the two-wire lines is selected such that for the transmission in both directions of transmission of the PCM words corresponding to one information sampling, the time interval is nearly the same as a sampling pulse frame as used on the TDM highways. Allowance is made for the transit times on the two-wire line and a tolerance interval is provided for the clock-pulse generators concerned. In this case a signalling bit rate is obtained on the two-wire line of about 256 kilobits. In two-wire lines having a 0.4-mm wire diameter, at least 700-m line lengths can be utilized without the need of pulse regeneration.

In the prior method discussed above, the time interval provided for the message itself is relatively brief as compared to the time intervals still to be taken into consideration, namely, transit time, timing-hybrid switch recovery time, and time for a start-of-word bit and a signalling bit.

SUMMARY OF THE INVENTION

It is an object of the invention to provide better utilization of the time for transmitting the telecommunication messages proper, so that the signalling bit rate for a transmission on a two-wire line may be reduced still further so as to increase the line length over which a message may be sent without pulse regeneration.

In accordance with the invention, the foregoing and other objects are achieved in that in both directions of transmission information blocks are alternately transmitted with two or more PCM words which correspond to the successive information samplings.

BRIEF DESCRIPTION OF THE DRAWINGS

The principles of the invention will be more readily understood by reference to the description of a preferred embodiment given hereinbelow in conjunction with the drawings.

FIG. 1 is a timing diagram of the transmission method referred to in the background portion of this application.

FIG. 2 is a timing diagram of the transmission method according to the invention.

FIG. 3 shows in block form a timing hybrid circuit such as may be used for carrying out the method in accordance with the teachings of the invention.

DESCRIPTION OF A PREFERRED EMBODIMENT

The format outlined below forms the basis for illustrating the method of the invention. The telecommunication network is operated at a 8-kcs sampling rate, which corresponds to a 125-microsecond sampling pulse frame. Each of the transmitted PCM words comprises 8 bits and forms in company with a start-of-block bit and a start-of-signaling bit a 10-bit information block. For a maximum line length of 4 kilometers, the section transit time is 5 microseconds per km.

If, on the two-wire line, a signalling bit rate of 256 kbit/sec. is used, that is, a 3.9-microsecond bit width, then the 125 microseconds of a sampling pulse frame is utilized as follows for the transmission in outgoing and incoming directions: two times 20 microseconds for the section transit time; two times 39 microseconds for the 10-bit information blocks; and, two times 3.5 microseconds for the timing hybrid circuit recovery time. That means that transmission of two 8-bit PCM words of the telecommunication message proper utilizes only 50% of the 125-microsecond interval.

In accordance with the method of the invention, the subscriber stations or the subscriber concentrator stations include timing hybrid circuits which make up information blocks which in addition to the start-of-block bit and the start-of-signalling bit, comprise two PCM words corresponding to two information samplings. These double words are formed because for each direction of transmission the information content of a sampling is first stored and then transmitted with the information content of the next sampling. Thus, the resultant information blocks now comprise 18 bits per direction of transmission, that is, one start bit and one signalling bit as well as two times 8 bits for the two PCM words. The resultant time ratios are shown in FIG. 2. For the line length, the section transit time and the timing-hybrid switchover time one assumes the same values as those in FIG. 1. Due to the 250-microsecond double transmission cycle time, 101.5 microseconds is now available for the information blocks per direction of transmission, in addition to the transit time and the timing circuit recovery time. That means for the 18 bits of such an information block a bit width of about 5.7 microseconds or a signalling bit rate of 177 kilobits per second. The time utilization for the transmission of the telecommunication message proper thus increases to over 73%.

If, for example, a "pseudoternary" code is used to code the PCM words in which the bits corresponding to a binary digit are shown by potential values that are alternately positive and negative relative to a reference potential, one obtains with the aid of the method of the invention and without equalizing networks a permissible line length of at least 1.05 km as against the previously mentioned line length for a single-word transmission.

If more bits are used than in the example described hereinabove and their transmission may occur in a larger cycle than that of the PCM words, it may be of advantage to build up the information block with more than two PCM words.

The timing hybrid circuit of FIG. 3 may be utilized for carrying out the method of the invention. It is connected on the left side via receive line wire LE and transmit line wire LS to a transmission unit (not shown) which establishes a connection with a two-wire line. The encoder/decoder of a subscriber station or the subscriber concentrator itself would be connected on the right side of the timing hybrid circuit of FIG. 3 (depending on whether it is a timing hybrid circuit associated with a subscriber station or the associated hybrid circuit of a subscriber concentrator).

To control the processes in the timing hybrid circuit, a sequence control A is provided which includes a send-/receive counter (first counter) controlling the information input from a receive register E or the information output from a send register S. Sequence control A also includes another counter (second counter) controlling the internal processes, namely, the transfer of information to/and from an intermediate register ZR as well as the information input from the subscriber concentrator of the encoder/decoder of the subscriber station to the send register S. The sequence control A accomplishes this by use of appropriate timing or clock pulse signals derived from a generator T and scaler TU which are sent out to the various elements over lines shown in the Figure. The differing timing or clock pulse signals on these lines are indicated by the designations CP1, CP2, and CP3.

If an information block arrives via the wire LE from the transmission unit from the two-wire line and the start-of-block bit is recognized by the unit BE, the first counter of the sequence control A immediately closes the switch K1 which connects the shift register clock pulse CP1 of, say, 176 kilobits/sec (5.7 microseconds per bit) from the time scaler TU to the receive register which accepts this information block. The clock pulse in question (CP1) is one of two outputs (CP1, CP2) generated by a clock-pulse scaler TU which is supplied with a fundamental clock rate by a clock-pulse generator T producing a 2.048 Mbits/sec clock pulse (CP3). With the 18th clock of the shift register clock pulse CP1 after the start-of-block bit, the start-of-signalling bit is sent to a signal interpreter SI.

When the first counter of the sequence control A has reached the counter position $Z=18$, that is, the 18th clock pulse of clock pulse CP1, the switch K2 is thereby rendered conductive or closed. The switch K2 is maintained in the closed position by the sequence control A during the subsequent 18 counter positions (18 additional clock pulses of clock pulse CP1) of the send-/receive counter. Thus, 18 clock pulses of shift register clock pulse CP1 arrive at send register S from clock pulse scaler TU through the switch K2; this results in the transfer of an information block to the two-wire line via line wire LS and the transmitting unit.

The above-mentioned second counter of the sequence control A is supplied by the clock-pulse scaler TU with a step-up clock pulse whose CP2 clock frequency (256 kilobits/sec) is produced by reducing the 2.048 Mbits/second clock pulse CP3 of the clock-pulse generator T by the factor 8.

The second counter of the sequence control A, which is set to the zero condition at the start of the send mode, closes the switches K3 and K4 during subsequent counter positions (i.e., during the period of two PCM words) which applies the clock pulse CP3 of the clock-pulse generator T to the receive register E and the intermediate register ZR. Thus, while the switches K3 and K4 are closed, two PCM words or 16 bits can be read out from the receive register E. A first 8-bit word is sent from the receive register E to the subscriber concentrator or the encoder/decoder circuit of the subscriber station via the intermediate register ZR, while the second 8-bit word remains in the intermediate register ZR. One sampling pulse frame (i.e., 125 microseconds) later, at counter position $Z=33$ of the second counter of the sequence control A, the switch K4 is closed and this second 8-bit word stored in the intermediate register ZR is likewise transferred to the subscriber concentrator or the encoder/decoder circuit. At the same time, the 2.048 Mbit clock pulse is applied to send register S over switch K5. Thus an 8-bit word can travel from the subscriber concentrator or the encoder/decoder to the send register S. Again, 125 microseconds later, after a second 8-bit word has been introduced in this manner into the send register S, the time sequence described hereinabove is repeated. Thus, at least two PCM words corresponding to successive information samplings of the digital data are sent out in each information block.

Other structures may be used to accomplish the method of this invention and may occur to those skilled in the art; the scope of the invention is not limited to this single embodiment, but only by the appended claims.

I claim:

1. A method for transmitting digital data between a digitally operating subscriber station and the subscriber concentrator of a PCM/TDM telecommunication network via a two-wire trunk line at a lesser signalling bit rate than on the TDM highways of the network, wherein the improvement comprises alternately transmitting in both directions of transmission information blocks with at least two PCM words which correspond to successive information samplings of the digital data.

* * * * *